United States Patent

[11] 3,600,065

[72] Inventors: Stanley James Law; Ian Hugh MacKenzie, both of Anniesland, England
[21] Appl. No. 869,154
[22] Filed Oct. 24, 1969
[45] Patented Aug. 17, 1971
[73] Assignee Barr and Stroud Limited, Anniesland, Glasgow, Great Britain
[32] Priority Nov. 1, 1968
[33] United Kingdom
[31] 51875/68

[54] OPTICAL PROJECTION HEAD
6 Claims, 1 Drawing Fig.
[52] U.S. Cl. .................................................. 350/247
[51] Int. Cl. .................................................. G02b 7/02
[50] Field of Search ................................. 350/46, 81, 63, 245, 247, 255, 310; 33/1, 72; 73/5, 37

[56] References Cited
UNITED STATES PATENTS
3,081,682  3/1963  Khoury ........................ 350/255
3,194,055  7/1965  Knobel ........................ 73/37.5
3,511,149  5/1970  Blattner et al. ............... 350/255 UX OTHER REFERENCES
Leonard, " Mount For Vibration Sensitive Equipment," Feb. 1967, p. 1123— 1124, I.B.M. Technical Disclosure Bulletin, Vol. 9, No. 9

Primary Examiner—David Schonberg
Assistant Examiner—Michael J. Tokar
Attorney—Mason, Fenwick and Lawrence ABSTRACT: An optical projection head adapted to maintain a lens system at a constant distance from a focal surface, including a support member in the form of a hollow elongated sleeve, a lens mounting member coaxially located within the support member and supporting a lens system defining an optical axis which is perpendicular to the focal surface, bearing formations spaced along the optical axis for slidably supporting the lens mounting member for movement in a direction parallel to the axis, and the lens mounting member having an end portion projecting from the sleeve which defines a gas bearing for supporting the lens system at a predetermined distance from the focal surface.

PATENTED AUG 17 1971
3,600,065
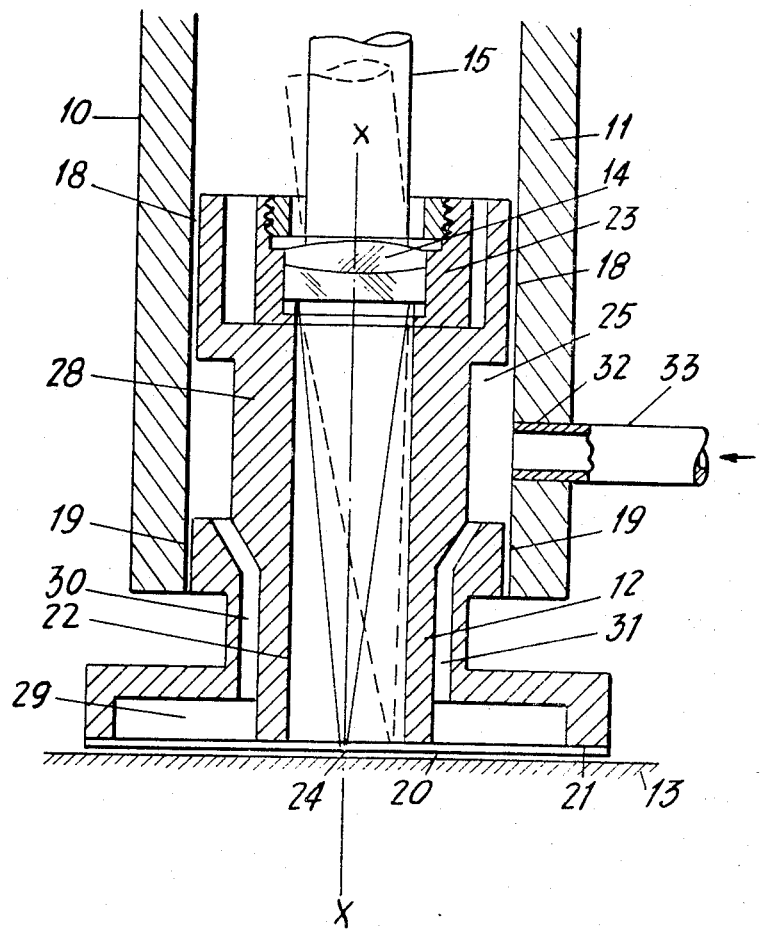
INVENTORS
STANLEY JAMES LAW &
IAN HUGH MACKENZIE
BY Mason, Fenwick & Lawrence
ATTORNEYS

OPTICAL PROJECTION HEAD

This invention relates to an optical projection head and in particular to an optical projection head adapted to maintain a lens system at a constant distance from a focal surface.

In some photographic processes projection systems have been proposed in which an optical projection head is movable by means of, for example, a trolley and gantry system, over a photosensitive surface. Difficulties, have been encountered in some draughting processes using these projection heads where extreme accuracy of focus and of position is necessary over a large area of the photosensitive material. This is because of the difficulty of providing and mounting a table for supporting the photosensitive sheet that is plane over the required area so that an exact spacing from the projection head may be achieved.

It is an object of this invention to obviate or mitigate the aforementioned difficulties.

According to the present invention there is provided an optical projection head including a supporting member, a first member mounted on said supporting member, a lens system mounted on said first member and defining an optical axis, said first member being slidably mounted on said supporting member in a direction parallel to said axis and being adapted to form a gas bearing for supporting the lens system at a predetermined distance from a surface normal to said axis.

An embodiment of the present invention will now be described, by way of example, with reference to the accompanying drawing the single FIGURE of which is a sectional elevation of an optical projection head.

Referring now to the drawing, an optical projection head 10, including a cylindrical sleeve 11 and a mounting member 12 slidable therein, is positioned over a photosensitive surface 13. A lens system 14 housed by the member 12 is adapted to focus a collimated light beam 15 incident on the lens system 14 on the photosensitive surface 13.

The member 12 is provided with an axial bore 22, and, near the end of the bore 22 remote from the surface 13 an enlarged portion 23 is provided wherein the lens system 14 is position-adjustably mounted so that the collimated light beam 15 incident thereon may be focused on the surface 13 at the point 24. The optical axis of the lens system 14 is denoted by the line X-X.

The sleeve 11 is positioned with its longitudinal axis substantially at right angles to the film surface 13 and the mounting member 12 is coaxially mounted in the sleeve 11 by means of two spaced air bearings 18 and 19 which allow the member 12 to be moved axially, to a limited extent, with respect to the sleeve 11 and to be rotated about its axis. A third air bearing 20 is provided between an end 21 of the member 12 and the film surface 13.

The air bearings 18 and 19 are supplied from a primary reservoir 25 formed by a reduced diameter portion 28 of the member 12 and the sleeve 11 intermediate the bearings 18 and 19, and the air bearing 20 is supplied from a secondary reservoir 29 formed by an annular recess in the end 21 of the member 12. Ducts 30 and 31 connect the reservoir 25 to the reservoir 29, and a hole 32 in the wall of the sleeve 11 connects the reservoir 25 with an air supply pipe 33.

With the projection head 10 in position on the photosensitive surface 13, the air pressure in the reservoir 29 is increased to a value sufficient to raise the member 12 from bearing on the surface 13, causing it to slide up inside the sleeve 11 to an equilibrium height and the pressure in the reservoir 29 is held constant thereafter. The lens system 14 is then manually adjusted to obtain a sharp focus at the point 24 on the photosensitive surface 13.

When the projection head 10 is moved laterally to another position with respect to the surface 13, the surface at this position may be fractionally higher or lower than at the first position. Since the pressure in the reservoir 25 and 29 is constant, the lens system 14 is moved up or down a distance corresponding to the difference between the height of the surface 13 at the two positions, keeping the collimated beam 15 sharply focused on the surface 13.

Thus the collimated beam 15 may be focused accurately on the surface 13 at any position simply by moving the mounting head laterally to that position.

The air bearings 18 and 19 allow the member 12 to slide axially inside the sleeve 11 without lateral displacement of the member 12 thus preventing lateral lens displacement and consequent image displacement errors. Further, since the optical axis of the lens system 14 is coincident with the axis of the bearings 18 and 19, rotation of the member 12 introduces no lens displacement and therefore no image displacement error.

Moreover, the air bearing 20 allows the projection head 10 to be moved over the photosensitive surface 13 without contact, thus avoiding damage to the photosensitive surface.

We claim:

1. An optical projection head to be moved over a surface, comprising a supporting member including an elongated sleeve having a bore extending along the longitudinal axis of the sleeve, a lens mounting member within the bore of said supporting member in coaxial relation, a lens system mounted on said lens mounting member and defining an optical axis normal to said surface, bearing means spaced along said optical axis for slidably supporting said lens mounting member in said supporting member for movement in a direction parallel to said optical axis, and said lens mounting member having an end portion projecting from said sleeve having means forming a gas bearing for supporting the lens system at a predetermined distance from said surface.

2. An optical projection head according to claim 1, wherein the sleeve is cylindrical and said lens mounting member is rotatable therein.

3. An optical projection head according to claim 1, wherein said bearing means include means defining a pair of axially spaced gas bearings for mounting the lens mounting member in the supporting member.

4. An optical projection head according to claim 2, wherein said bearing means include means defining a pair of axially spaced gas bearings for mounting the lens mounting member in the supporting member.

5. An optical projection head according to claim 1, wherein said lens system is position-adjustably mounted on said lens mounting member.

6. An optical projection head according to claim 3, wherein said lens system is position-adjustably mounted on said lens mounting member.